United States Patent [19]
Kabune et al.

[11] Patent Number: 5,897,596
[45] Date of Patent: Apr. 27, 1999

[54] ELECTRONIC CONTROLLER WITH FAULT DIAGNOSING FUNCTION

[75] Inventors: Hideki Kabune, Chiryu; Hajime Kumabe, Anjo, both of Japan

[73] Assignee: Nippondenso Co., Ltd., Kariya, Japan

[21] Appl. No.: 08/701,391

[22] Filed: Aug. 22, 1996

[30] Foreign Application Priority Data

Aug. 25, 1995 [JP] Japan .................................. 7-217838
Jul. 17, 1996 [JP] Japan .................................. 8-187243

[51] Int. Cl.$^6$ ...................................................... B60T 8/60
[52] U.S. Cl. ........................... 701/29; 701/76; 303/122.04
[58] Field of Search .................................. 701/29, 76, 34, 701/107; 340/438, 449; 303/122, 122.04, 122.06; 307/9.1, 10.1

[56] References Cited

U.S. PATENT DOCUMENTS

| | | | |
|---|---|---|---|
| 4,259,659 | 3/1981 | Ariyoshi et al. | 340/73 |
| 4,597,052 | 6/1986 | Matsuda | 364/550 |
| 4,701,854 | 10/1987 | Matsuda | 364/426 |
| 4,707,758 | 11/1987 | Matsuda | 361/18 |
| 5,021,955 | 6/1991 | Ito et al. | 364/424.1 |
| 5,190,009 | 3/1993 | Kadota | 123/339 |
| 5,372,410 | 12/1994 | Miller et al. | 303/92 |
| 5,648,759 | 7/1997 | Miller et al. | 340/660 |

FOREIGN PATENT DOCUMENTS

| | | |
|---|---|---|
| 62-195321 | 12/1987 | Japan . |
| 63-261412 | 10/1988 | Japan . |
| 1-281509 | 11/1989 | Japan . |

*Primary Examiner*—Michael Zanelli
*Attorney, Agent, or Firm*—Pillsbury Madison & Sutro LLP

[57] ABSTRACT

An electronic controller includes an internal power stabilizing circuit which supplies stabilized power to drive circuits and a fail-safe relay drive circuit all built within the controller, a monitoring unit which monitors the operational states of the circuits in the controller based on the state of power output of the power stabilizing circuit, and a drive unit which drives the fail-safe relay drive circuit in response to the detection by the monitoring unit of a predetermined output state of the power stabilizing circuit indicative of the occurrence of abnormality in at least one of the circuits including the drive circuits within the controller.

18 Claims, 3 Drawing Sheets

ELECTRONIC CONTROLLER WITH FAULT DIAGNOSING FUNCTION

CROSS-REFERENCE TO RELATED APPLICATIONS

The present application is related to and claims priority from Japanese Patent Application Nos. Hei 7-217838 and 8-187243, incorporated herein by reference.

BACKGROUND OF THE INVENTION

1. Field of the Invention

The present invention relates to an electronic controller used mainly in a vehicle control system, and particularly to a fail-safe function for an electronic controller with fault diagnosing ability configured in one or more integrated circuits or for a system equipped with such an electronic controller.

2. Description of Related Art

On vehicles, electronic control units (hereinafter "ECUs") are used for, e.g., anti-lock brake systems (hereinafter "ABS" systems) and traction control systems (hereinafter "TRC" systems). A crucial feature of these systems and the ECUs used in these systems is a fail-safe capability for ensuring the safety of the vehicle.

For example, if the ECU of an ABS system fails, the conventional foot brake function must be restored immediately. As shown in FIG. 3, for this switching operation to the safety side to take place swiftly in the event of ECU failure, the ECU generally includes a fail-safe relay 54 as well as an associated relay drive circuit 52, an intra-ECU power circuit 42, a central processing unit (CPU) 49 and a drive circuit 51 for the actuator 53.

The CPU 49 is used for processing data in carrying out the ABS operation. The fail-safe relay 54 is activated when an ECU abnormality is detected based on the mutual monitoring among the CPUs of control systems, including ROM check, RAM check and routine skip check through the mutual communication lines, or based on the watchdog pulse monitoring by the monitoring circuit 47 as is known in the art.

Multistage intervals between transmission and reception of watchdog pulse signals enable detection of routine skip and discrimination of abnormalities such as routine skip and runaway computations in the CPU 49.

The intra-ECU power circuit 42 which stabilizes the supply voltage from the battery 41, the output over-current limiter circuit 43, the IC overheat protection circuit 44, the IC over-voltage protection circuit 45, the output power control circuit 46, the watchdog pulse monitoring circuit 47 and the CPU reset circuit 48 are generally integrated in one IC package. The CPU 49, the sensor signal processing circuit 50, the actuator drive circuit 51 and the fail-safe relay drive circuit 52 are generally built in individual IC packages.

However, recent high-performance ECUs have an increased scale and complexity of internal circuit arrangement, and the above-mentioned ECU diagnosis based on the mutual CPU monitoring or watchdog pulse monitoring is limited in its ability of abnormality detection only to circuits that generate watchdog pulses or the like. On this account, the ECU diagnosis covers only important circuits, and it may fail to accurately detect an abnormality occurring, for example, in the actuator drive circuit 51 which activates the actuator of the anti-lock brake system or the like in response to the CPU output signal or in the sensor signal processing circuit 50 which delivers the sensor output signal to the CPU.

SUMMARY OF THE INVENTION

Accordingly, an object of the present invention is to provide an electronic controller with fault diagnosing function which is simple in structure and capable of accurately detecting the occurrence of an abnormality including an abnormality of the actuator drive circuit within the ECU that has been difficult to detect in the past.

Another object of the present invention is to provide an electronic controller with fault diagnosing function which is can detect the occurrence of an abnormality in at least one of the circuits that are supplied with power from the internal power stabilizing circuit within the ECU so that the occurrence of abnormality can be detected accurately for an increased number of monitored points including the actuator drive circuit, sensor signal processing circuit and CPU without the need of an increased number of monitoring circuits.

In order to achieve the above objects, a first aspect of the present invention provides an electronic controller with fault diagnosing function which includes a drive circuit for driving an actuator, an internal power stabilizing circuit which stabilizes power received from an external power source and supplies stabilized power to the drive circuit, a monitoring unit which monitors the operational state of the drive circuit based on the state of power output of the power stabilizing circuit, and a determination unit which determines the occurrence of abnormality in the drive circuit in response to the detection of a predetermined operational state by the monitoring unit.

The power output state of the internal power stabilizing circuit indicates the operational state of the drive circuit which is supplied with power from the power stabilizing circuit and the state of wiring which connects the drive circuit to the power stabilizing circuit. For example, if a short-circuit occurs on the wiring of drive circuit or the drive circuit runs out of control, the internal power stabilizing circuit will have a pronounced increase in its output, and these abnormalities can be detected accurately through the monitoring of the power output state.

The above objects are achieved according to another aspect of the present invention by providing a plurality of drive circuits for driving actuators, a fail-safe circuit which switches the operation of the entire system including the electronic controller and actuators to the safety side, an internal power stabilizing circuit which supplies stabilized power to the drive circuits, a monitoring unit which monitors the operational states of the drive circuits based on the state of power output of the power stabilizing circuit, and a drive unit which drives the fail-safe circuit in response to the detection by the monitoring unit of the occurrence of abnormality in at least one of the drive circuits.

The above objects are achieved according to yet another aspect of the invention by providing an actuator that is a brake controller of a vehicle brake system which implements brake control in controlled brake mode which depends on the operational state of the vehicle body or wheels of the vehicle in place of normal brake mode, with a fail-safe relay drive circuit operating to switch the controlled brake mode to the normal brake mode in response to the activation of the fail-safe relay drive circuit.

Accordingly, with an electronic controller with fault diagnosing function being applied to the ECU of vehicle brake system according to the present invention, the fail-safe relay is simply operated to restore the normal brake mode in the event of the occurrence of abnormality in the ECU, and the safety of the brake system can be ensured in a simple and reliable manner.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A preferred embodiment of the present invention will be described in detail with reference to the drawings.

Figure 1:
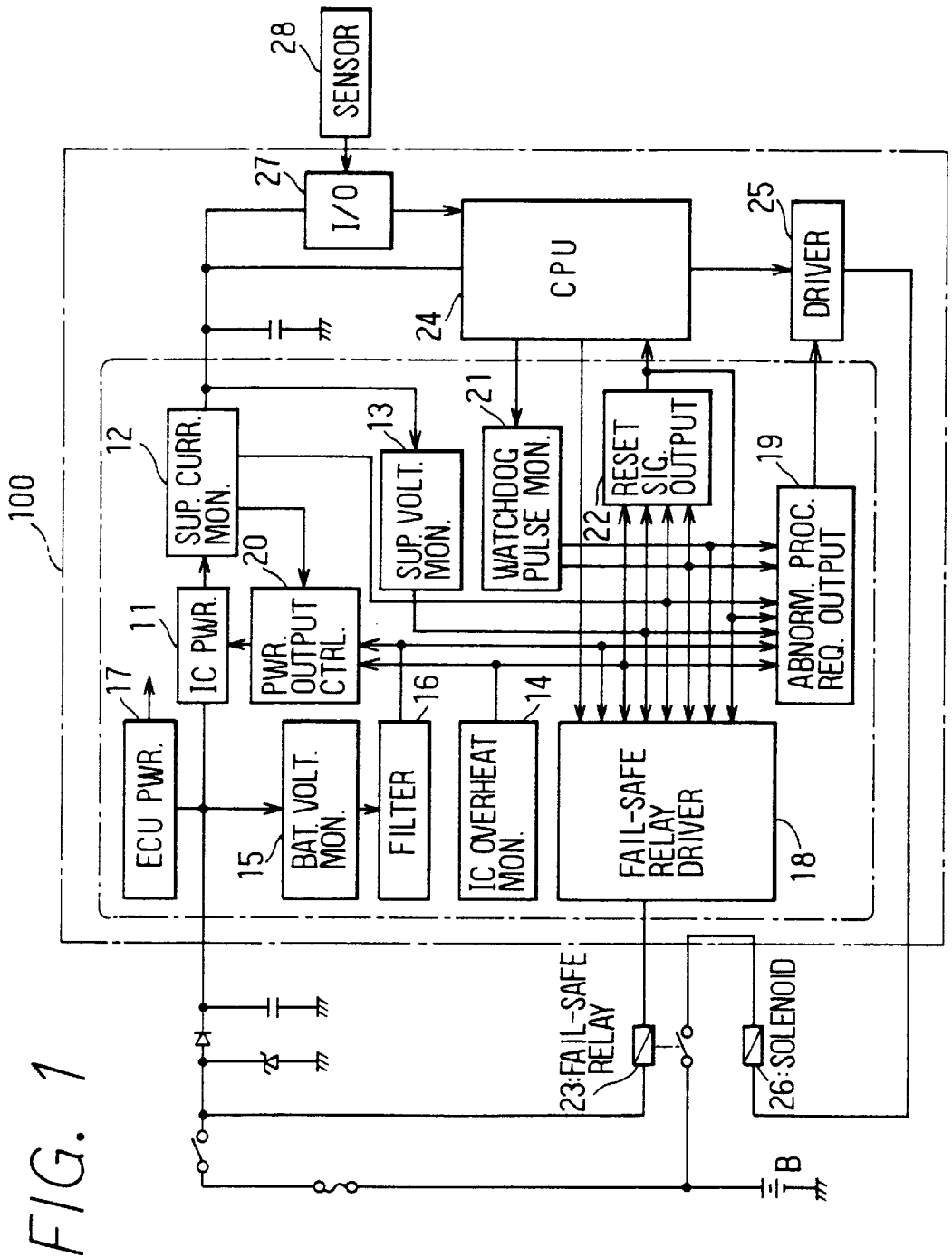
FIG. 1 is a block diagram of the ECU based on this invention.

FIG. 1 shows an ECU 100 with fault diagnosing function according to a preferred embodiment of the present invention used in the brake control system of a vehicle.

The vehicle brake control system includes the ECU 100, a battery B, a fail-safe relay 23, a sensor 28 and an actuator 26 that is a solenoid valve of a fluid pump of an anti-skid control mechanism.

An intra-ECU power circuit 11 supplies stabilized power to internal circuits including a signal I/O circuit 27 for receiving a signal from a sensor 28, a CPU 24 and an actuator drive circuit 25. Further included in the ECU 100 are a supply current monitoring circuit 12, a supply voltage monitoring circuit 13, an IC overheat monitoring circuit 14, and a battery voltage monitoring circuit 15 which monitors the battery voltage supplied to the ECU 100 to detect an abnormality of the battery B.

The supply current monitoring circuit 12 monitors the total load current of the ECU 100, i.e., the sum of load currents of the circuits in the ECU 100, to detect a pronounced variation in the load current indicative of failure, breakdown or short-circuit of wiring of at least one of the circuits of ECU that are supplied with power from the intra-ECU power circuit 11.

That is, the supply current monitoring circuit 12 monitors the total load current of circuits receiving current supply from the intra-ECU power circuit 11. The supply current monitoring circuit 12 similarly functions with respect to the individual circuits in the ECU 100.

The supply voltage monitoring circuit 13 monitors the sum of the power voltages of the circuits in the ECU 100 to detect a failure or breakdown, in advance of such a breakdown jeopardizing safety, of at least one of the circuits of the ECU 100 that are supplied with power from the intra-ECU power circuit 11.

The IC overheat monitoring circuit 14 monitors the temperature of the IC packages of the ECU 100 to detect an abnormally high temperature indicative of the breakdown of an IC package driving an actuator, an IC package having the intra-ECU power circuit 11, or an IC package receiving current supply from the intra-ECU power circuit 11. One IC package accommodates the intra-ECU power circuit 11, supply current monitoring circuit 12, fail-safe relay drive circuit 18, abnormality process request signal output circuit 19, watchdog pulse monitoring circuit 21 and reset signal output circuit 22. The CPU 24, the signal input circuit 27 and the actuator drive circuit 25 are built in individual IC packages.

The battery voltage monitoring circuit 15 is used to monitor the voltage supplied by the battery B as a power source of the vehicle to the ECU 100, to detect an abnormally high or low voltage indicative of a malfunction or breakdown of the circuits in the ECU 100, thereby supplementing the functions of the supply current monitoring circuit 12. A prior art battery voltage monitoring circuit, which is solely intended to protect the IC package, has its detection voltage level set to as high as around 30 V for a 12-volt battery in order to avoid erroneous detection of noise included in the battery voltage caused by load fluctuation or other noise sources. In contrast, the battery voltage monitoring circuit 15 according to this invention is designed to accurately detect the border of the operational voltage range of the circuits, which is around 17 v for a 12-volt battery, based on the provision of a filter circuit 16 for preventing the erroneous detection of voltage noise.

Consequently, an ECU abnormality including an impermissible operating condition of the ECU 100 which can cause the breakdown or malfunctioning of the ECU 100 can generally be detected in indirect manner by these monitoring circuits. The abnormality detect signals from these monitoring circuits and the abnormality detect signal issued by the CPU 24 to the watchdog pulse monitoring circuit 21 are processed logically in accordance with TABLE I below so that the fail-safe relay drive circuit 18, abnormality process request signal output circuit 19, power output control circuit 20 and reset signal output circuit 22 are operated accordingly. Upon detection of an ECU abnormality, the fail-safe relay 23 is activated, the actuator drive circuit 25 is deactivated, the CPU 24 is halted, and the intra-ECU power circuit is cut off so that the control system turns to the safety side. The abnormality process request signal output circuit 19 disables communication between the CPU 24 and other circuits.

TABLE I

| MONITOR DETECTION RESULT | | | | | CONTROL STATE | | | |
|---|---|---|---|---|---|---|---|---|
| SUPP. CURR. MON. 12 | SUP. VOLT. MON. 13 | IC HEAT MON. 14 | BAT. VOLT. MON. 15 | W/DOG PULSE MON. 21 | F-S REL. DR. 18 | AB. PROC. SIG. 19 | IC PWR. 11 | RESET PWR. 22 |
| NORM. | NORM. | NORM. | NORM. | NORM. | ON | OFF | ON | OFF |
| AB. | — | NORM. | NORM. | — | OFF | ON | ON | ON |

TABLE I-continued

| MONITOR DETECTION RESULT | | | | | CONTROL STATE | | | |
| --- | --- | --- | --- | --- | --- | --- | --- | --- |
| SUPP. CURR. MON. 12 | SUP. VOLT. MON. 13 | IC HEAT MON. 14 | BAT. VOLT. MON. 15 | W/DOG PULSE MON. 21 | F-S REL. DR. 18 | AB. PROC. SIG. 19 | IC PWR. 11 | RESET PWR. 22 |
| — | AB. | NORM. | NORM. | — | OFF | ON | ON | ON |
| — | — | AB. | — | — | OFF | ON | OFF | ON |
| — | — | — | AB. | — | OFF | ON | OFF | ON |
| NORM. | NORM. | NORM. | NORM. | AB. 1 | OFF | ON | ON | OFF |
| NORM. | NORM. | NORM. | NORM. | AB. 2 | ON | OFF | ON | ON |

In the "Monitor Detection Result" section of TABLE I, a dash character "-" indicates a "don't care" condition; "NORM." indicates a normal operation detection result, and "AB." indicates an abnormal operation detection result. "AB 1" indicates detection of abnormality level 1, and "AB 2" indicates detection of abnormality level 2 (these abnormality levels will be described in greater detail below). In the "Control State" section, "ON" indicates an active signal, and "OFF" indicates an inactive signal.

In case the actuator 26 is used in an ABS system or TRC system, the fail-safe relay 23 may be deactivated in the event of ECU failure so that the ABS control mode is simply switched to the normal brake mode. The ECU 100 of the present invention may be used in the brake system, rather than to an engine controlling ECU which is not easily suspended.

As described above, through the provision of two or more monitoring units such as the supply current monitoring circuit 12 and watchdog pulse monitoring circuit 21, it is possible to switch the control system to the safety side reliably even in the event of the breakdown of one monitoring circuit.

Figure 3:
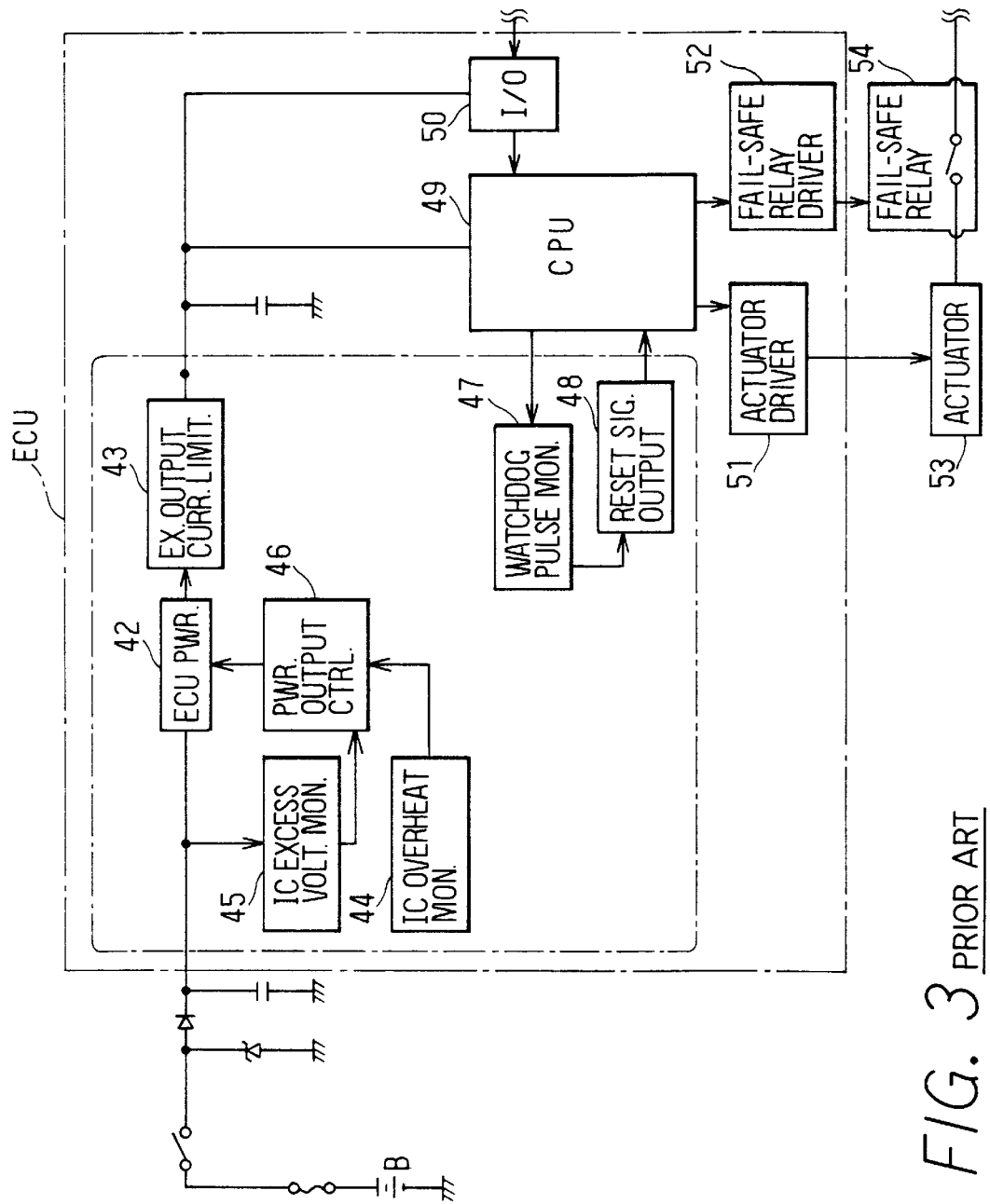
FIG. 3 is a block diagram of an ECU according to the prior art.

The watchdog pulse monitoring by the CPU 24 may be based on three monitor levels of the watchdog pulse output circuit in the CPU 24 and the watchdog pulse monitoring circuit 21, which are the normal level, abnormality level 1 indicative of the abnormality of CPU 24, and abnormality level 2 indicative of the abnormality of circuits other than the CPU 24 as shown in FIG. 3. Specifically, during a certain processing routine of the CPU 24, e.g., at the beginning or the end of the main routine, the watchdog pulse output circuit (not shown) generates a watchdog pulse signal.

If the routine proceeds regularly, watchdog pulse signals are generated at a constant interval and are received by the watchdog pulse monitoring circuit. If a routine skip occurs, the successive pulse signal will be generated and received earlier. Watchdog pulse signals will be generated and received at a shorter interval if the CPU 24 or other circuit runs out of control. If processing does not pass through the section of the routine where the watchdog pulse signal is generated due to CPU failure, for example, no watchdog pulse signals will be generated or received.

Based on the interval of watchdog pulse signals received, the watchdog pulse monitoring circuit 21 makes the determination of abnormality in multiple levels to detect the abnormality of CPU 24, of a circuit other than the CPU 24, or of a system component external to the ECU 100. Following the determination of malfunctioning of the solenoid valve or motor of ABS system, the watchdog pulse monitoring result is switched from the normal level to the abnormality level 1. In this case, the reset signal is not issued to the CPU 24, i.e., the brake control mode is switched from the ABS mode to the normal brake mode, with other operations of the ECU 100 including the CPU 24 being kept active, in accordance with TABLE I. Accordingly, the ECU 100 is still operative to indicate the defective portion for ease of maintenance.

Through the provision of two or more monitoring functions of the supply current monitoring circuit 12 and watchdog pulse monitoring circuit 21 for dealing with the abnormality of the fail-safe relay 23 and actuator 26 to switch the control system to the safety side, a reliable safety system can be provided.

By designing the watchdog pulse monitoring circuit so that it does not reset the CPU at the detection of abnormality of one of two levels, the CPU may perform self-diagnosis for the circuit for switching the control system to the safety side at the time of power-on, and the reliability of the circuit is enhanced.

Figure 2A:
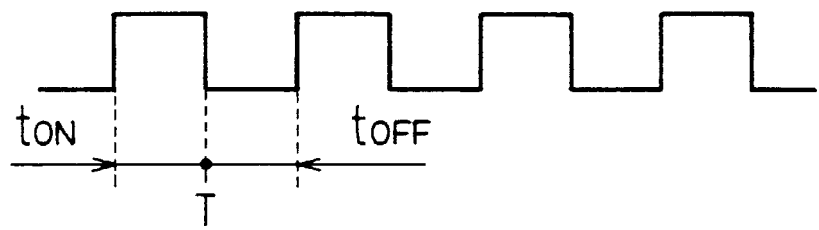
FIG. 2A is a graph of the watchdog pulse to be monitored.
Figure 2B:
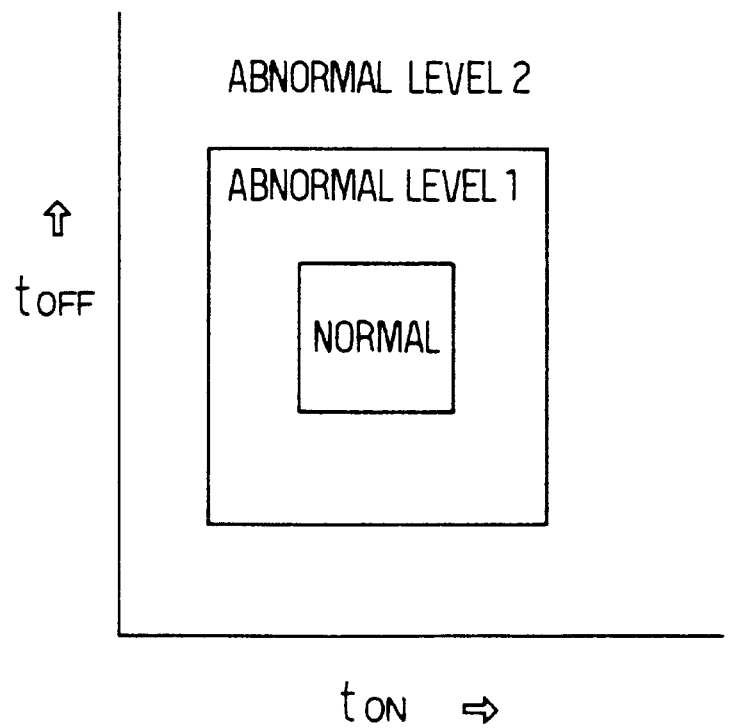
FIG. 2B is a diagram showing the domains of detection monitor levels.

The watchdog pulse may have a waveform as shown in FIG. 2A so that the abnormality determination is based on the duty cycle thereof, i.e., the ratio of the on-period from pulse starting until end to the off-period from the end until the next pulse starting of the waveform, in correspondence with the monitoring level map shown in FIG. 2B.

The intra-IC power circuit 17 is a second power circuit built in the IC package of ECU, and it supplies power to the supply current monitoring circuit 12, supply voltage monitoring circuit 13, IC overheat monitoring circuit 14, and battery voltage monitoring circuit 15. Accordingly, these circuits have their own power source independent of the intra-ECU power circuit 11 and retain their functions even upon the occurrence of abnormality that forces the intra-ECU power circuit 11 to shut down.

Based on the foregoing circuit arrangement including two or more ways of switching the control system to the safety side, the ECU 100 according to the present invention detects ECU failure accurately. As shown in FIG. 1, it does not need to have special parts, in contrast to the conventional circuit arrangement shown in FIG. 3 including the watchdog pulse monitoring circuit, reset signal output circuit, over-voltage protection circuit, over-current limiter circuit and overheat protection circuit. In addition, the fail-safe relay drive circuit 18 does not need external wiring since it is integrated with the intra-ECU power circuit 11. Consequently, the overall operation from the detection of ECU abnormality to the switching of the control system to the safety side can be implemented entirely within this IC package, and other IC packages such as the CPU 24, actuator drive circuit 25 and signal input circuit 27 do not need to have special monitoring circuits.

The present invention is not limited to the foregoing embodiment, but various modifications are possible. For example, among the supply current monitoring circuit 12, supply voltage monitoring circuit 13 and IC overheat monitoring circuit 14 all used in the foregoing embodiment, only one or two of these circuits need be used. Among the monitoring circuits including the supply current monitoring circuit 12 and the watchdog pulse monitoring circuit 21 used in the foregoing embodiment, the latter circuit 21 may be eliminated. In this case, the supply current monitoring circuit 12 detects the ECU abnormality and activate the fail-safe relay 23 to switch the control system to the safety side.

Instead of building the intra-ECU power circuit 11 and fail-safe relay drive circuit 18, the CPU 24 and the actuator drive circuit 25 in three separate IC packages, all circuits of the ECU 100 may be integrated in a single IC package. In this case, the operational states of all circuits that are supplied with power from the intra-ECU power circuit 11 can readily be monitored based on the total load current and supply voltage.

It is also possible to monitor the occurrence of abnormality of battery B and the breakage or short-circuit of external ECU wiring through the monitoring of the state of output of the intra-ECU power circuit 11. For example, battery failure can be detected through the detection of a reduced output current of the intra-ECU power circuit 11 to the CPU 24, actuator drive circuit 25 and the like, and the control system can be switched to the safety side. Through the monitoring of the state of output of the intra-ECU power circuit 11, it is possible to detect the abnormality of the circuits that are supplied with power from the power circuit 11, a short-circuit in the ECU, and the abnormality of the external power lines to the power circuit 11.

Although the present invention has been fully described in connection with the preferred embodiment thereof with reference to the accompanying drawings, it is to be noted that various changes and modifications will become apparent to those skilled in the art. For example, the present invention can be applied to other systems, e.g., a vehicle airbag system, in addition to the brake system, and can be applied extensively to systems other than vehicles. Such changes and modifications are to be understood as being included within the scope of the present invention as defined by the appended claims.

What is claimed is:

1. An electronic controller, having a fault diagnosing function, for operating an actuator, said controller comprising:
   a drive circuit for driving said actuator;
   an internal power stabilizing circuit for stabilizing power received from an external power source and for supplying stabilized power to said drive circuit;
   monitoring means for monitoring an operational state of said drive circuit based on a state of power output of said internal power stabilizing circuit and for detecting a predetermined operational state of said drive circuit; and
   determination means for determining an occurrence of abnormality in said drive circuit responsive to detection of a predetermined operational state by said monitoring means.

2. An electronic controller with fault diagnosing function according to claim 1, wherein:
   said controller comprises a plurality of drive circuits; and
   said monitoring means is for monitoring operational states of said drive circuits based on a state of power output of said internal power stabilizing circuit to said drive circuits.

3. An electronic controller, having a fault diagnosing function, for operating actuators of systems equipped with fail-safe mechanisms, said controller comprising:
   a plurality of drive circuits for driving said actuators;
   a fail-safe circuit for switching said systems from a normal operational mode to a safety mode;
   an internal power stabilizing circuit which supplies stabilized power to said drive circuits;
   monitoring means for monitoring operational states of said drive circuits based on a state of power output of said internal power stabilizing circuit and for determining a predetermined operational state of said drive circuits; and
   means for driving said fail-safe circuit responsive to occurrence of an abnormality in at least one of said drive circuits responsive to detection of said predetermined operational state by said monitoring means.

4. An electronic controller according to claim 3, wherein said fail-safe circuit and said internal power stabilizing circuit are in a common IC package.

5. An electronic controller according to claim 3, wherein:
   said controller further comprises a sensor for generating a signal representative of information used to drive said actuators; and
   each of said plurality of drive circuits includes
      at least one signal processing circuit for processing said signal generated by said sensor,
      at least one computation circuit for executing a computation based on said signal processed by said signal processing circuit, and
      at least one actuator drive circuit for operating a corresponding one of said actuators responsive to a result of said computation circuit.

6. An electronic controller according to claim 5, wherein said at least one signal processing circuit, said at least one computation circuit and said at least one actuator drive circuit are in separate IC packages.

7. An electronic controller according to claim 6 further including issuing means for issuing, responsive to a result of monitoring by said monitoring means, an abnormality process request signal for switching a communication mode of said IC packages so that said actuators are switched to a safety mode.

8. An electronic controller according to claim 7, wherein:
   said at least one computation circuit includes a central processor having an output circuit which delivers multi-level watchdog pulses in response to detection by said central processor of an abnormality of multiple levels of devices including said actuators; and
   a watchdog pulse circuit for receiving an output of said output circuit of said central processor, for operating said means for driving said fail-safe circuit to activate said fail-safe circuit and for operating said abnormality process request signal output means to issue said abnormality process request signal responsive to determination of a first abnormality level based on an output of said output circuit, said watchdog pulse circuit also for operating said means for driving said fail-safe circuit to activate said fail-safe circuit, for operating said abnormality process request signal output means to issue said abnormality process request signal, and for resetting said central processor responsive to determination of a second abnormality level.

9. An electronic controller according to claim 3, wherein said fail-safe circuit and said internal power stabilizing circuit are integrated in a common IC package.

10. An electronic controller according to claim 3, wherein said monitoring means comprises load current monitoring means for monitoring a total load current of circuits that are supplied with power from said internal power stabilizing circuit.

11. An electronic controller according to claim 3, wherein said monitoring means comprises supply current monitoring means for monitoring a total supply current from said internal power stabilizing circuit to circuits that are supplied with power from said power stabilizing circuit.

12. An electronic controller according to claim 3, wherein said monitoring means comprises supply voltage monitoring means for monitoring a supply voltage from said internal power stabilizing circuit to circuits that are supplied with power from said power stabilizing circuit.

13. An electronic controller according to claim 3, wherein:

said internal power stabilizing circuit includes an integrated circuit element; and said monitoring means includes overheat monitoring means for monitoring, as said power output state, a temperature of said integrated circuit element.

14. An electronic controller according to claim 3, wherein:

said computation circuit includes a central processor having an output circuit which delivers multi-level watchdog pulses in response to detection by said central processor of an abnormality of multiple levels of devices including said actuators; and a watchdog pulse circuit for receiving an output of said output circuit of said central processor and for operating said means for driving said fail-safe circuit to activate said fail-safe circuit responsive to a result of determination of a first abnormality level based on an output of said output circuit, and for resetting said central processor and operating said means for driving said fail-safe circuit to activate said fail-safe circuit responsive to determination of a second abnormality level.

15. An electronic controller according to claim 14, wherein:

said output circuit is for sending a predetermined signal as said watchdog pulse to said watchdog pulse circuit during execution by said central processor of at least part of a computation routine; and said watchdog pulse circuit is for discriminating in multiple degrees an interval of reception of said signal to distinguish at least said first abnormality level and said second abnormality level.

16. An electronic controller according to claim 3, wherein:

said actuators include a brake controller of a vehicle brake system for implementing brake control in a controlled brake mode responsive to motion of at least one of a body of a vehicle in which said controller is disposed and wheels of said vehicle in place of a normal brake mode;

said electronic controller is for operating said brake controller; and said fail-safe circuit is for switching said brake system from said controlled brake mode to said normal brake mode responsive to activation of said fail-safe circuit.

17. A vehicle system including an electronic controller, having a fault diagnosing function, for operating actuators, a fail-safe circuit for activating said actuators to switch said vehicle system from a normal operational mode to a safety mode responsive to occurrence of an abnormality in at least a part of said vehicle system, and an external power source for supplying power to said electronic controller, said electronic controller comprising:

a plurality of drive circuits for driving said actuators;

an internal power stabilizing circuit for stabilizing power received from said external power source and for supplying stabilized power to said drive circuits;

monitoring means for monitoring operational states of said drive circuits based on a state of power output of said internal power stabilizing circuit and for detecting a predetermined operational condition of said drive circuits; and a fail-safe circuit drive circuit for driving said fail-safe circuit responsive to detection by said monitoring means of said predetermined operational state of said power stabilizing circuit, said predetermined operational state of said power stabilizing circuit being indicative of occurrence of abnormality in at least one of said drive circuits.

18. An electronic controller, having a fault diagnosing function, comprising:

a central processor including an output circuit generating a predetermined signal as a watchdog pulse indicative of an abnormality level of a device external to said electronic controller during execution by said central processor of at least part of a computation routine;

a watchdog pulse circuit for receiving said predetermined signal of said output circuit, for discriminating in multiple degrees an interval of signal reception;

a fail-safe circuit for switching said device from a normal operational mode to a safety mode;

drive means for driving said fail-safe circuit;

wherein said watchdog pulse circuit is further for driving said drive means responsive to determination of a first abnormality level based on said reception interval, and for resetting said central processor and operating said drive means to drive said fail-safe circuit responsive to determination of a second abnormality level based on said reception interval.

* * * * *